June 27, 1950 — C. L. CHRISTENSEN — 2,513,003
HITCH
Filed March 12, 1948

Inventor
Charles L. Christensen
by M. Talbert Dick
Attorney

Witness

Patented June 27, 1950

2,513,003

UNITED STATES PATENT OFFICE 2,513,003

HITCH

Charles L. Christensen, Woden, Iowa

Application March 12, 1948, Serial No. 14,460

5 Claims. (Cl. 280—33.44)

The principal object of my invention is to provide a foldable hitch for farm implements such as moving combines, and like that when attached to the tongue of the same is capable of pulling a wagon or similar vehicle along with the combine or like.

A further object of this invention is to provide a wagon or like hitch for combines that is easily placed in a folded condition when not in use, or when the combine or like is passing through a restricted area such as a highway, gate or like.

A still further object of my invention is to provide a vehicle hitch for combines or like that may be secured to operate either on the left or right side of the combine or like.

A still further object of this invention is to provide a vehicle hitch for combines or like that is easily and quickly attached to or detached from the combine or like.

Still further objects of my invention are to provide a vehicle hitch for combines or like that is economical in manufacture and durable and strong in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Figures 1, 2, 3, 4, 5, 6:
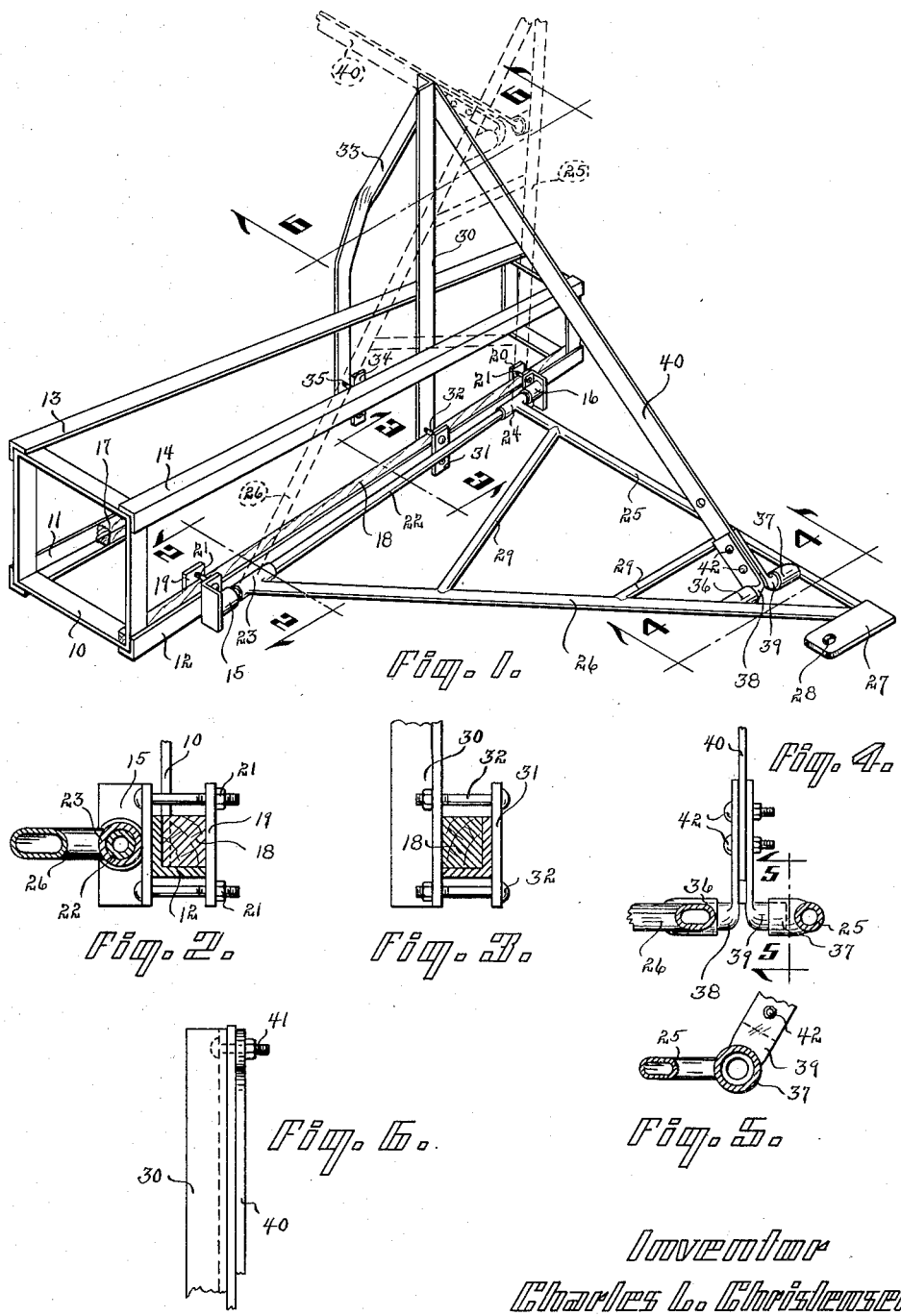
Fig. 1 is a perspective view of my hitch, with dotted lines showing its arrangement when in an elevated folded position.
Fig. 2 is a cross-sectional view of the device taken on line 2—2 of Fig. 1.
Fig. 3 is a cross-sectional view of the device taken on line 3—3 of Fig. 1, and more fully illustrates how the hitch is attached to the tongue frame.
Fig. 4 is a cross-sectional view of the device taken on line 4—4 of Fig. 1 and more fully illustrates its construction.
Fig. 5 is a cross-sectional view of a portion of the device taken on line 5—5 of Fig. 4.
Fig. 6 is a side view of the device taken from line 6—6 of Fig. 1.

While my device is particularly designed for attaching a wagon to a tractor drawn harvesting combine, it is obvious that it may be successfully used wherever it is desired to attach a vehicle to and along the side of another moving vehicle. In the case of combines, such machines do not hold and carry much threshed grain. The result is that it is necessary to stop frequently and unload the threshed grain or like into a wagon or like. This requires much time and labor. I have overcome such problems by providing a novel hitch that makes possible the securing of the wagon or like to the combine, and the pulling of the same alongside the combine during the threshing operation.

Referring to the drawings I have used the numeral 10 to generally designate the elongated rectangular frame. This portion may be considered either as the tongue of the combine or may be secured to or around the tongue of the combine. However, regardless of its origin or other purpose, or design, it is secured to, or is a part of the tongue of the combine and provides a base for the foldable portion of my hitch. In the drawings this part 10, besides its end members, comprises the four spaced apart elongated angle irons 11, 12, 13 and 14, facing each other. In the drawings I show the foldable part of the device extending to the right of the member 10. The numerals 15 and 16 designate two spaced apart bearing members. The numerals 17 and 18 designate two wooden beams resting on and in the two frame angle irons 11 and 12 respectively. The bearing members 15 and 16 rest adjacent the outer side of the angle iron 12. On the inner side of the angle iron, engaging the beam 18, and adjacent the two bearing members 15 and 16, respectively, are the two plates 19 and 20 as shown in Fig. 1. Bolts 21 connect the plate 19 to the bearing member 15 and the plate 20 to the bearing member 16. By tightening these bolts the plates and bearing members will be drawn together, clamping the angle iron 12 and beam 18 between them, thereby rigidly, but detachably securing the bearing members to the frame 12. The numeral 22 designates a shaft extending between and having its two ends rotatably mounted in the bearing members 15 and 16. The numerals 23 and 24 designate two spaced apart sleeves rotatably mounted around the shaft 22 and adjacent the bearing members 15 and 16 respectively. The numeral 25 designates an arm formed on the sleeve 24 and normally extending outwardly at substantially a right angle to the longitudinal axis of the frame 10. The numeral 26 designates an arm extending from the bearing member 23, forwardly and outwardly so that its free end contacts the free end of the arm 25 as shown in Fig. 1. The numeral 27 designates a draw bar secured on the free end of the arms 25 and 26 and having a hole 28 to facilitate the attachment of the vehicle, wagon or like to be pulled alongside the combine or like. The numeral 29 designates brace rods extending between the arms 25 and 26. The numeral 30 designates a vertical post having its bottom end adjacent the inner side of the beam 18 and angle iron 12 and at a point between the two bearing members 15 and 16 as shown in Fig. 1. This post is detachably secured similar to the bearing members 15 and 16, by the use of a plate 31 and bolts 32. The numeral 33 designates a brace having its lower end detachably secured to the outer side of the angle iron 11 and beam 17 by like plate 34 and bolts 35. The upper end of the brace is bent to the right to meet and be secured to the upper end of the post 30. It extends, for strength, to the outside of the angle iron 13. The numerals 36 and 37 designate two facing bearing members secured to the two arms 25 and 26 respectively, and near the outer ends of the arms 25 and 26 as shown in Fig. 1. The numeral 38 designates a shaft journaled in the bearing member 36 and having its outer end flattened and bent at a right angle. The numeral 39 designates a duplicate shaft journaled in the bearing member 37. The two free flattened ends of these shafts 38 and 39 normally extend upwardly and inwardly parallel and adjacent to each other. The numeral 40 designates a support bar, normally having one end secured to the top portion of the post 30 by a bolt 41 and its other end extending between the two flattened ends of the shafts 38 and 39 and secured thereto by bolts 42. This bar extends downwardly and outwardly to the left and normally supports the arms 25 and 26 in a horizontal plane. When my device is installed as heretofore described it is in an operative position to pull a vehicle. As before designated however, it is desirable at times to fold the hitch as shown by dotted lines in Fig. 1. This is accomplished by removing the bolt 41, raising the wing (consisting of the arms 25 and 26 and associated parts) to a substantially vertical position, and then extending the removed bolt through the top portion of the post 30 and hole in the support bar 40, located near the shafts 38 and 39. The wing of the device will be held in such desired folded condition until it is again desired to lower it to a horizontal position. This folding of the wing is made possible by the bearing members 15 and 16, shaft 22, sleeves 23 and 24, bearing members 36 and 37 and shafts 38 and 39. The bearing members, shafts and parts, also permits the placement of the wing on the left side of the frame when it is desired to have a left side hitch. In such case the bearing members 15 and 16, and the post 30 are placed on the angle iron 11 and beam 17, and the member 33 is placed on the angle iron 12 and beam 18.

Some changes may be made in the construction and arrangement of my hitch without departing from the real spirit and purpose of my invention, and it is my intention to cover by my claims, any modified forms of structure or use of mechanical equivalents which may be reasonably included within their scope.

I claim:

1. In a device of the class described, a rectangular elongated frame portion, a post extending upwardly from said frame portion, two bearing members secured to the lower portion of said frame, a shaft journaled in said bearing members, two arms rotatably secured to and extending from said shaft and meeting at their outer ends, a means for securing a vehicle to the outer ends of said two arms, two bearing members on the outer end portions of each of said arms respectively; said last two bearing members facing each other and spaced apart, two shafts journaled in said last mentioned two bearing members respectively each having its free end flattened and bent at a right angle, a support bar having its outer end extending between the flattened ends of said two shafts and its other end portion adjacent the upper end portion of said post, and bolts extending through said support bar and said post and the flattened ends of said two shafts.

2. In a device of the class described, a rectangular elongated frame portion, a post extending upwardly from said frame portion, two bearing members secured to the lower portion of said frame, a shaft journaled in said bearing members, two arms rotatably secured to and extending from said shaft and meeting at their outer ends, a means for securing a vehicle to the outer ends of said two arms, two bearing members on the outer end portions of each of said arms respectively; said last two bearing members facing each other and spaced apart, two shafts journaled in said last mentioned two bearing members respectively each having its free end flattened and bent at a right angle, a support bar having its outer end extending between the flattened ends of said two shafts and its other end portion adjacent the upper end portion of said post, a bolt extending through the flattened ends of said two shafts and said support bar; said support bar having a bolt hole near its inner upper end and a bolt hole near its outer end, and a bolt extending through the upper end of said post capable of selectively extending through either of said bolt holes in said support bar.

3. In a device of the class described, a frame portion, a post extending from said frame portion, two bearing members detachably secured to the lower portion of said frame, two arms operatively rotatably secured to said bearing members and meeting at their outer ends, a means for securing a vehicle to the outer ends of said two arms, two bearing members on the outer end portions of each of said arms respectively; said last two bearing members facing each other and spaced apart, two shafts journaled in said last mentioned two bearing members respectively each having its free end flattened and bent at a right angle, a support bar having its outer end extending between the flattened ends of said two shafts and its other end portion adjacent the upper end portion of said post, and bolts extending through said support bar and said post and the flattened ends of said two shafts.

4. In a device of the class described, a frame portion, a post extending from said frame portion, two bearing members secured to the lower portion of said frame, two arms operably rotatably secured to and extending from said bearing members and meeting at their outer ends, a means for securing a vehicle to the outer ends of said two arms, two bearing members on the outer end portions of each of said arms respectively; said last two bearing members facing each other and spaced apart, two shafts journaled in said last mentioned two bearing members respectively each having its free end flattened and bent at a right angle, a support bar having its outer end extending between the flattened ends of said two shafts and its other end portion adjacent the upper end portion of said post, a bolt extending through the flattened ends of said two shafts and said support bar; said support bar having a bolt hole near its inner upper end and a bolt hole near its outer end, and a bolt extending through the upper end of said post capable of selectively extending through either of said bolt holes in said support bar.

5. In a device of the class described, a rectangular elongated frame portion, a post detachably extending upwardly from said frame portion, two bearing members detachably secured to the lower portion of said frame, a shaft journaled in said bearing members, two arms extending from said shaft and meeting at their outer ends, a means for securing a vehicle to the outer ends of said two arms, two bearing members on the outer end portions of each of said arms respectively; said last two bearing members facing each other and spaced apart, two shafts journaled in said last mentioned two bearing members respectively each having its free end flattened and bent at a right angle, a support bar having its outer end extending between the flattened ends of said two shafts and its other end portion adjacent the upper end portion of said post, a bolt extending through the flattened ends of said two shafts and said support bar; said support bar having a bolt hole near its inner upper end and a bolt hole near its outer end, and a bolt extending through the upper end of said post capable of selectively extending through either of said bolt holes in said support bar.

CHARLES L. CHRISTENSEN.

REFERENCES CITED

The following references are of record in the file of this patent:

UNITED STATES PATENTS

| Number | Name | Date |
|---|---|---|
| 841,794 | Line | Jan. 22, 1907 |
| 1,941,821 | Baker | Jan. 2, 1934 |
| 2,021,840 | Ellis et al. | Nov. 19, 1935 |
| 2,442,267 | Eksergian | May 25, 1948 |